United States Patent [19]
Chao

[11] Patent Number: 5,351,659
[45] Date of Patent: Oct. 4, 1994

[54] SHAFT ENGINE

[76] Inventor: Kuo-An Chao, 2F, No. 8, Alley 6, Lane 207, Sec. 3, Ho-Ping E. Rd., Taipei, Taiwan

[21] Appl. No.: 167,588

[22] Filed: Dec. 14, 1993

[51] Int. Cl.⁵ .............................................. F02D 19/00
[52] U.S. Cl. ................................ 123/61 R; 123/73 AA
[58] Field of Search ............ 123/61 R, 73 AA, 65 R, 123/61 V

[56] References Cited

U.S. PATENT DOCUMENTS

| | | | |
|---|---|---|---|
| 1,679,766 | 8/1928 | Friend et al. | 123/61 R |
| 2,780,208 | 2/1957 | Brown | 123/61 R |
| 3,340,855 | 9/1967 | Brown | 123/61 R |
| 3,955,543 | 5/1976 | Brown | 123/61 R |
| 4,627,389 | 12/1986 | Simon | 123/73 AA |

Primary Examiner—Tony M. Argenbright
Assistant Examiner—M. Macy
Attorney, Agent, or Firm—Pro-Techtor International

[57] ABSTRACT

A shaft engine including a piston moved in a cylinder to reciprocate at least one cylinder shaft causing it to turn a crank shaft, the at least one cylinder shaft having a respective longitudinal air passage linked to either raised air chamber on the cylinder through a respective extension tube on either raised air chamber for sending exhaust gas out of the cylinder.

7 Claims, 10 Drawing Sheets

B-B

B-B

SHAFT ENGINE

BACKGROUND OF THE INVENTION

The present invention relates to a shaft engine having cylinder shafts reciprocated by the piston thereof to move a crank shaft for power output, wherein the cylinder shafts comprise air passages for guiding a fuel gas into the cylinder and for sending exhaust gas out of the cylinder respectively.

The engine of a motor vehicle is generally comprised of a cylinder having a piston or pistons reciprocated, by means of the burning of a fuel gas in the cylinder, to turn a crank shaft. This structure of engine further comprises an exhaust piping system, intake and exhaust valves, and an exhaust cam. Therefore, this structure of engine is complicated and difficult to maintain. Because of a complicated structure, the manufacturing cost and weight of this engine are relatively increased. Further, in a two stroke engine, the exhaust and intake strokes are simultaneously performed when the piston is moved to the lower limit, and therefore the problem of low combustion efficiency and high exhaust emissions cannot be eliminated.

SUMMARY OF THE INVENTION

The present invention eliminates the aforesaid drawbacks. It is one object of the present invention to provide a shaft engine which is simple in structure, lightweight, and inexpensive to manufacture. It is another object of the present invention to provide a shaft engine which is easy to maintain, and durable in use. It is still another object of the present invention to provide a shaft engine which is efficient in operation. It is still another object of the present invention to provide a shaft engine which greatly saves the consumption of fuel gas. It is still another object of the present invention to provide a shaft engine which greatly reduces exhaust emissions.

According to one embodiment of the present invention, the shaft engine comprises a piston moved in a cylinder to reciprocate a plurality of cylinder shafts causing them to turn a crank shaft, wherein the cylinder shafts have a respective longitudinal air passage linked to either raised air chamber on the cylinder through a respective extension tube on either raised air chamber for sending exhaust gas out of the cylinder and guiding a fuel gas into the cylinder respectively.

DETAILED DESCRIPTION OF THE PREFERRED EMBODIMENTS

Figure 1:
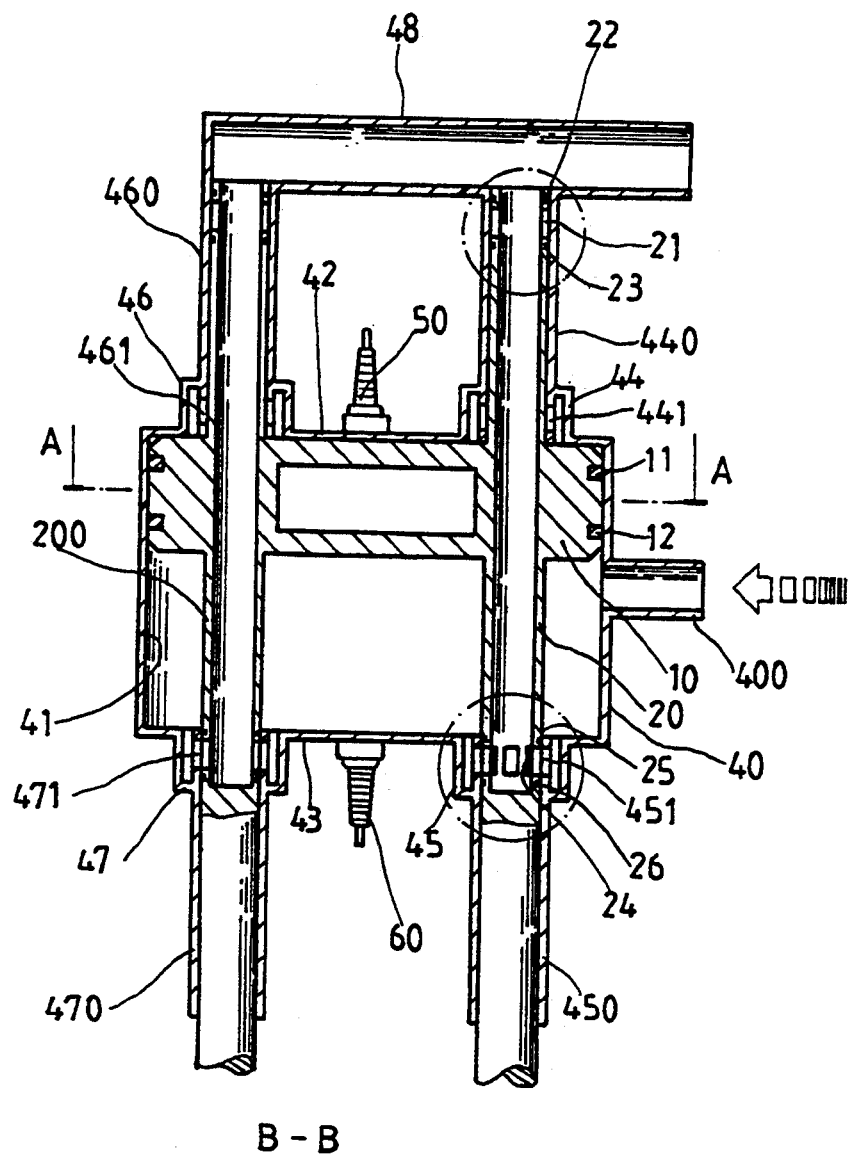
FIG. 1 is an assembly view in section of a shaft engine according to a first embodiment of the present invention.
Figure 1A:
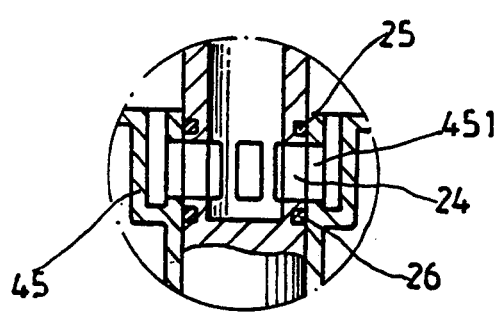
Figure 2:
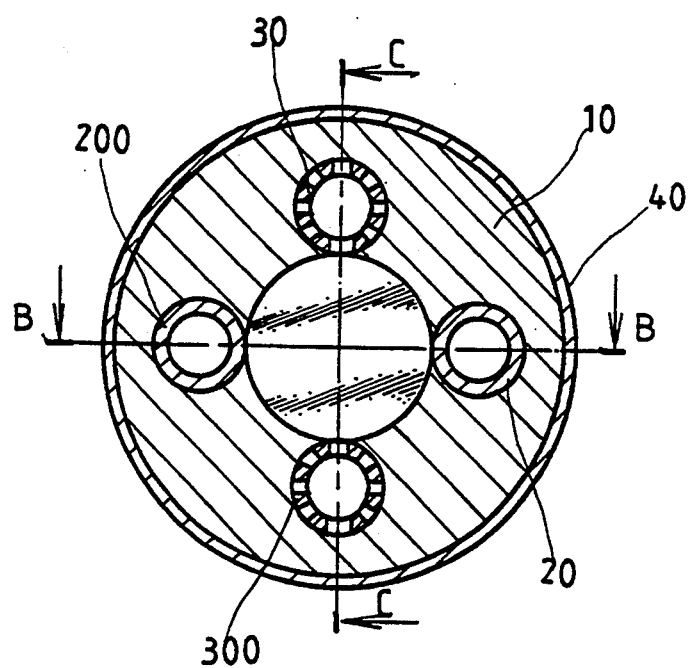
FIG. 2 is a cross section taken along line AA of FIG. 1.

Referring to FIGS. 1 and 2, a shaft engine in accordance with the present invention is generally comprised of a piston 10 made to slide in a cylinder 40, a first pair of shafts 20;200 and a second pair of shafts 30;300 symmetrically fastened to the piston 10, a plurality of piston rings 11;12 mounted around the periphery of the piston 10 and closely touching the inside wall 41 of the cylinder 40. The first pair of shafts 20;200 are identical in shape, each having two I/O (input/output) air holes 21 or 24 at two opposite ends. Seal rings 22;23 or 25;26 are respectively mounted within the I/O air hole 21 or 24 of either shaft 20 or 200. The cylinder 40 comprises air chambers 44;45;46;47 at two opposite sides 42;43 thereof, two upper extension tubes 440;460 and two lower extension tubes 450;470 respectively extended outwards from the air chambers 44;45;46;47 which receive the shafts 20;200. The upper extension tubes 440;460 at the top side are linked by a transverse tube 48. The first shafts 20;200 extend out of the lower extension tubes 450;470, and are connected to a crank shaft 49 (see FIG. 7). An intake pipe 400 is connected to the cylinder 40. When the piston 10 is moved to the upper limit (see FIG. 1), it is disposed at a slightly higher elevation above the intake pipe 400. Two spark plugs 50;60 are mounted on the cylinder 40 at the top and bottom sides. The extension tubes 440;450;460;470 comprise a respective through hole 441;451;461;471 in communication with either air chamber 44;45;46;47.

Figure 3:
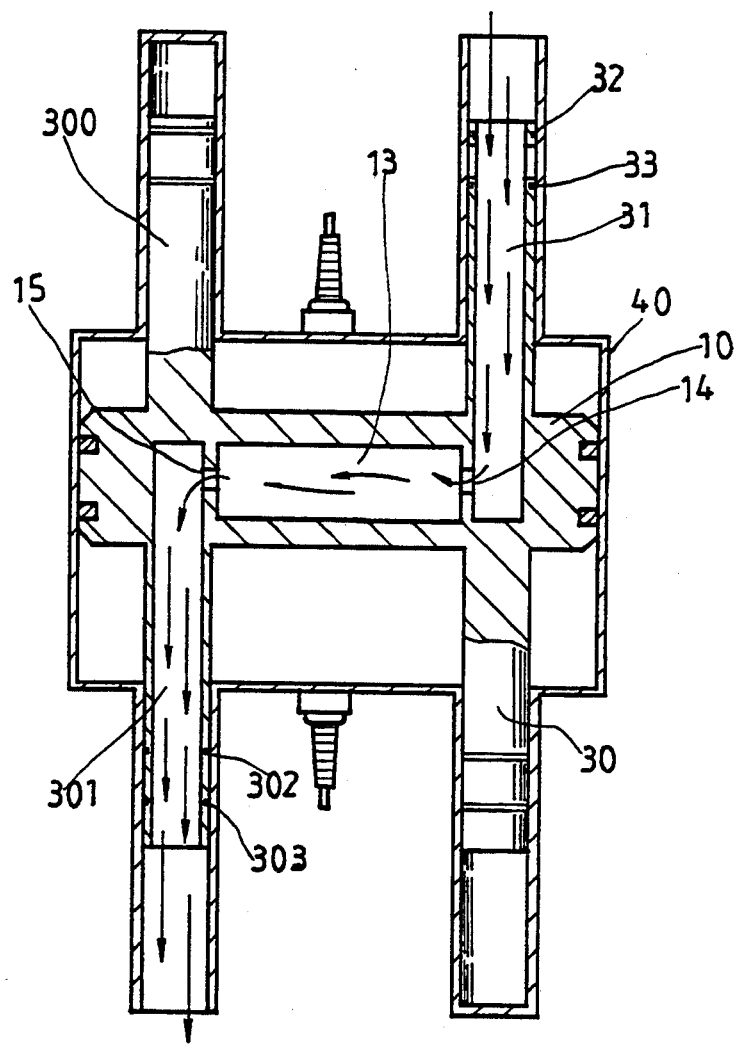
FIG. 3 is a cross section taken along line CC of FIG. 2.

Referring to FIG. 3 and FIG. 1 again, one shaft 30 of the second pair of shafts has a longitudinal oil passage 31 through its upper part disposed in communication with the inside space 13 of the piston 10 through a hole 14 on the piston 10; the other shaft 300 of the second pair of shafts has a longitudinal oil passage 301 through its lower part disposed in communication with the inside space 13 of the piston 10 through a hole 15 on the piston 10 to provide a passage way for oil cooling. Seal rings 32;33;302;303 are respectively mounted around the shafts 30;300 and closely touching the inside wall of either extension tube 440 or 470.

Figure 4:
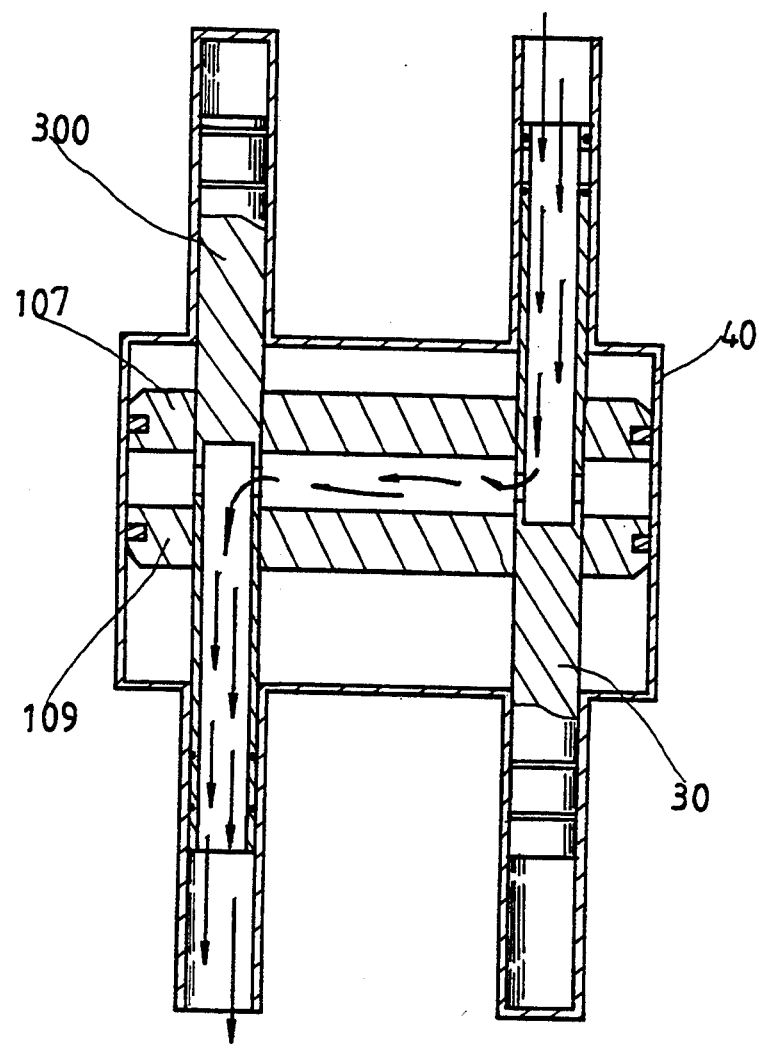
FIG. 4 shows an alternate form of the piston of the shaft engine of FIG. 1.

Referring to FIG. 4, therein illustrated is an alternate form of the piston 10 in which the piston 20 is comprised of two symmetrical parts 107;109 separated by a space communicated between the longitudinal oil passages 31;301.

Figure 5:
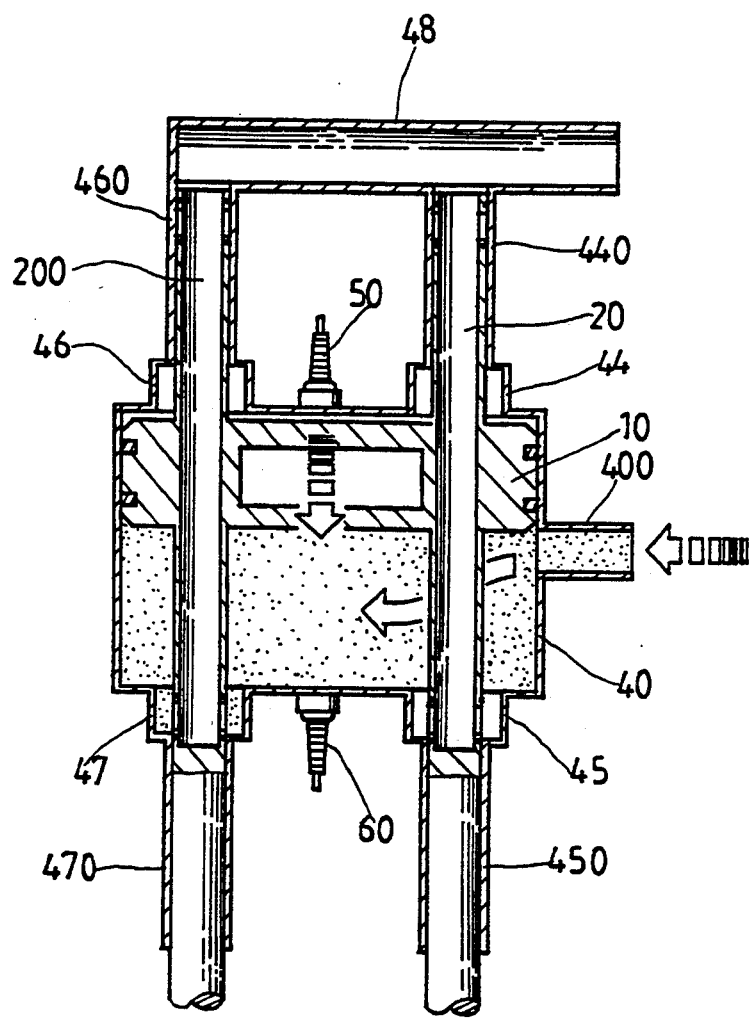
FIG. 5 is similar to FIG. 1 but showing a fuel gas guided into the cylinder.
Figure 6:
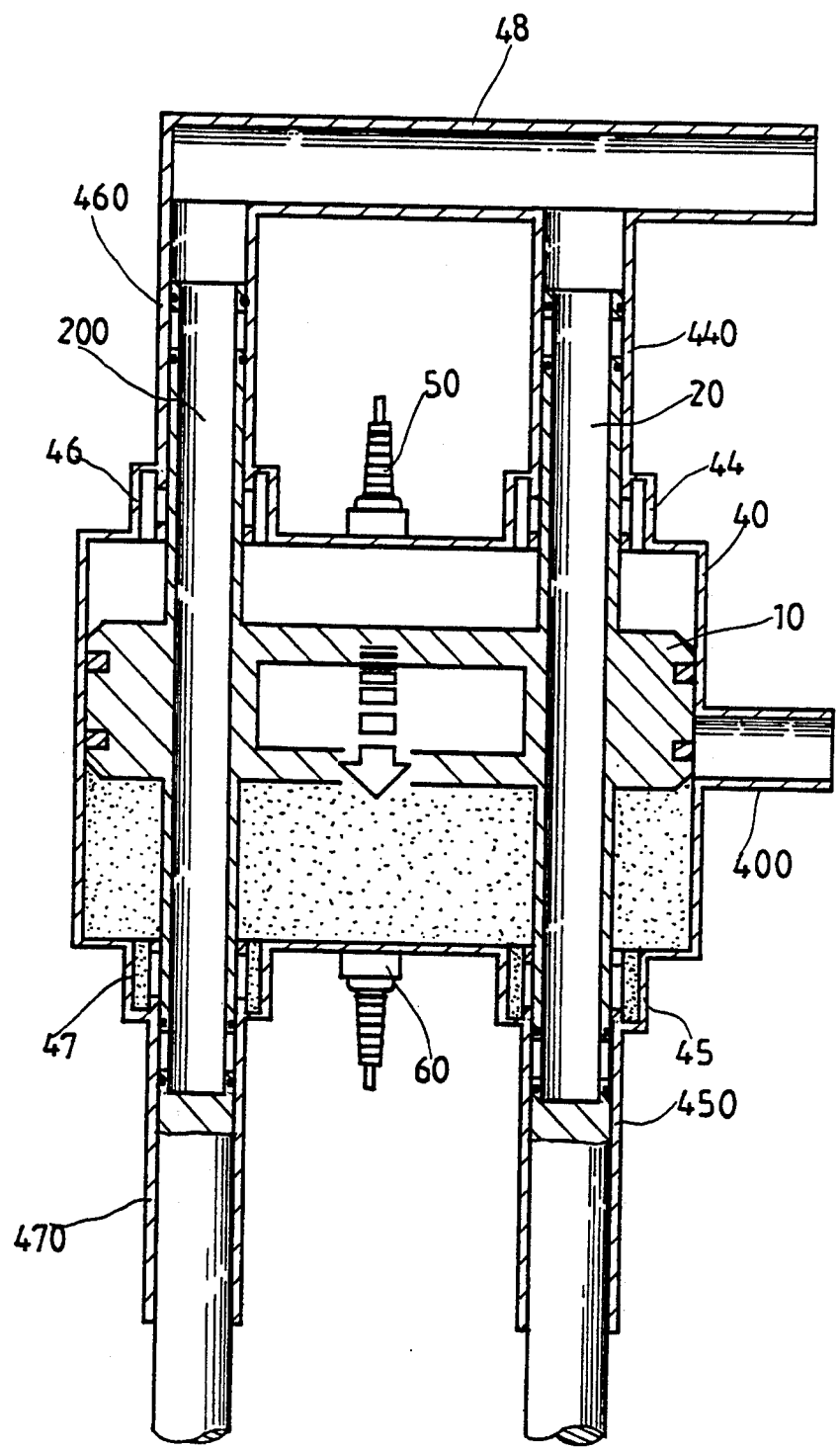
FIG. 6 is similar to FIG. 5 but showing the piston moved downward to compress the fuel gas.

Referring to FIGS. 5 and 6, when the piston is moved to the upper limit, a fuel gas is guided from the intake pipe 400 into the inside space of the cylinder 40. When the piston is moved downwards, the fuel gas inside the cylinder 40 is compressed and burnt by the spark plug 60 at the bottom to induce an explosion stroke.

Figure 7:
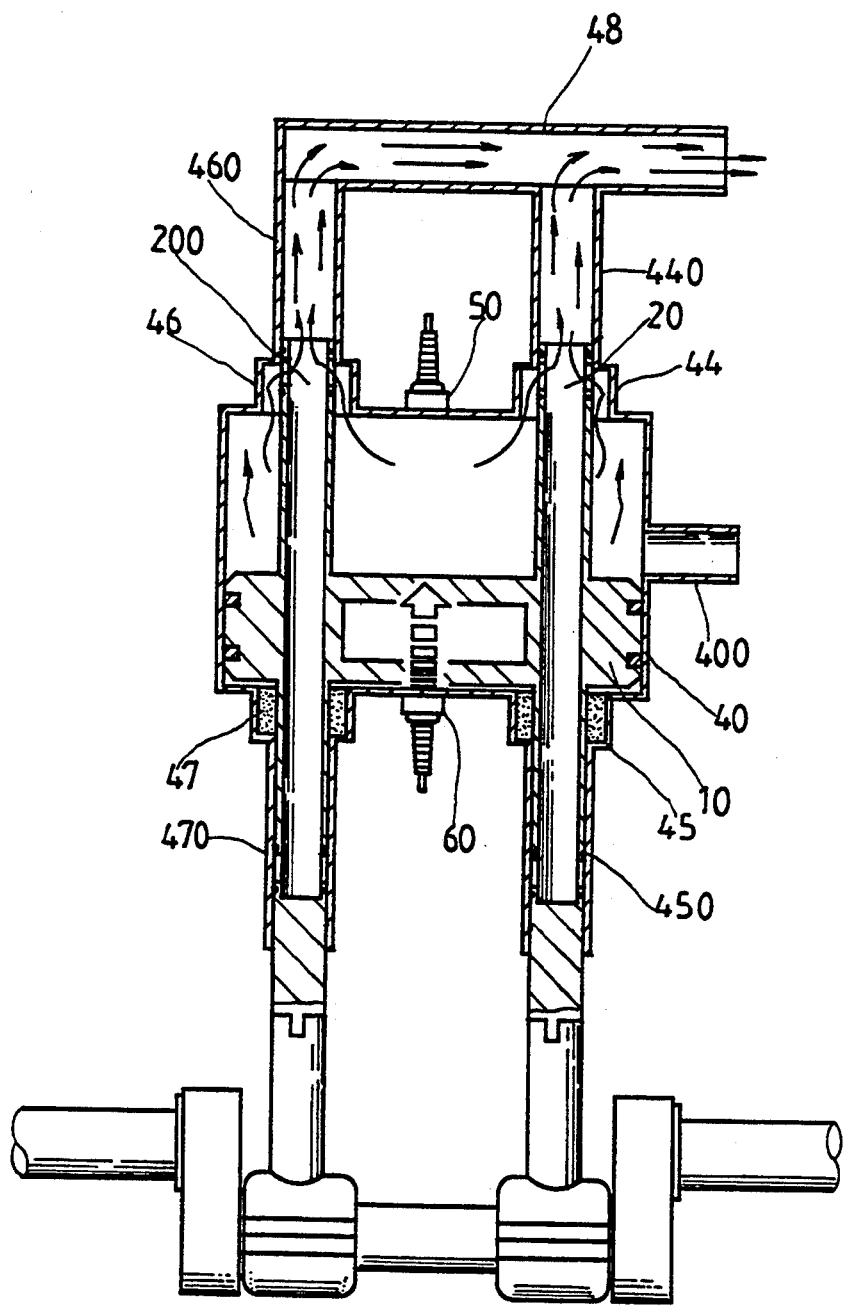
FIG. 7 shows the piston of the shaft engine of FIG. 1 moved to the lower limit.

Referring to FIG. 7, when the piston 10 is moved to the lower limit, the air holes 21 of the first pair of shafts 20;200 are respectively communicated with the through holes 441;461 of the upper extension tubes 440;460 for permitting exhaust gas to escape out of the cylinder 40 through the first pair of shafts 20;300 and the transverse tube 48. At the same time, a flow of the fuel gas is guided into the cylinder 40 from the intake pipe 400. When the piston 10 is moved upwards to compress the fuel gas, another stroke is performed, and power is sent out through the crank shaft 49.

Figure 8:
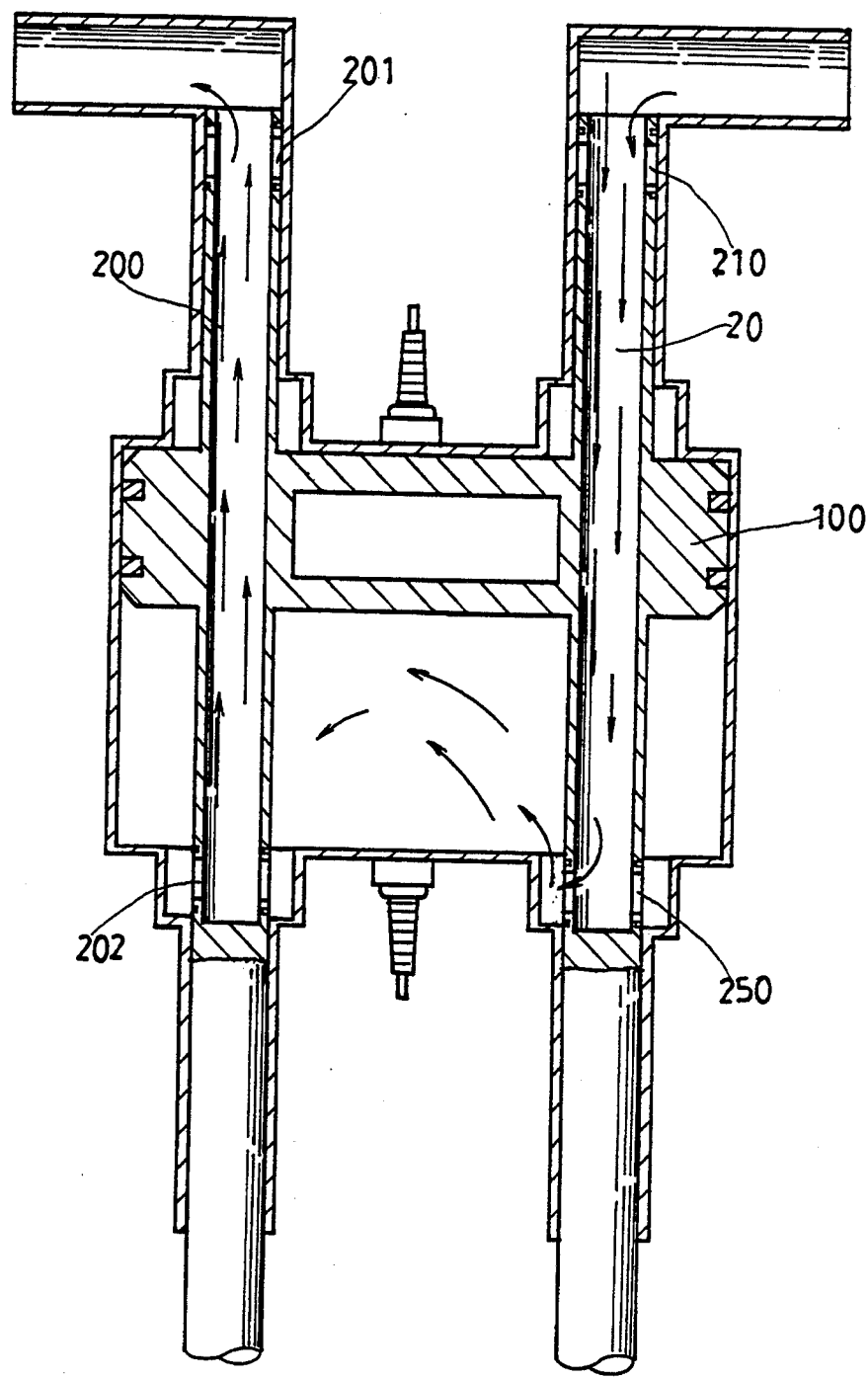
FIG. 8 is a longitudinal view in section of a shaft engine according to a second embodiment of the present invention.

Referring to FIG. 8, therein illustrated is an alternate form of the present invention, in which one shaft 20 is made to guide the fuel gas into the cylinder; another shaft 200 is made to guide exhaust gas out of the cylinder. This arrangement eliminates the installation of the intake pipe. According to this alternate form, the shaft 20 or 200 has an upper air hole 210 or 201 near the top in the radial direction and a lower air hole 250 or 202 in the middle. When the piston 100 is moved to the upper limit, the fuel gas is guided into the cylinder; when the piston 100 moves downwards, the fuel gas in the cylinder is compressed; when the piston 100 is moved to the lower limit, the upper air holes 210;201 are opened for letting the fuel gas to enter the cylinder and exhaust gas to escape out of the cylinder; when the piston 100 moves upwards, the fuel gas is compressed again.

Figure 9:
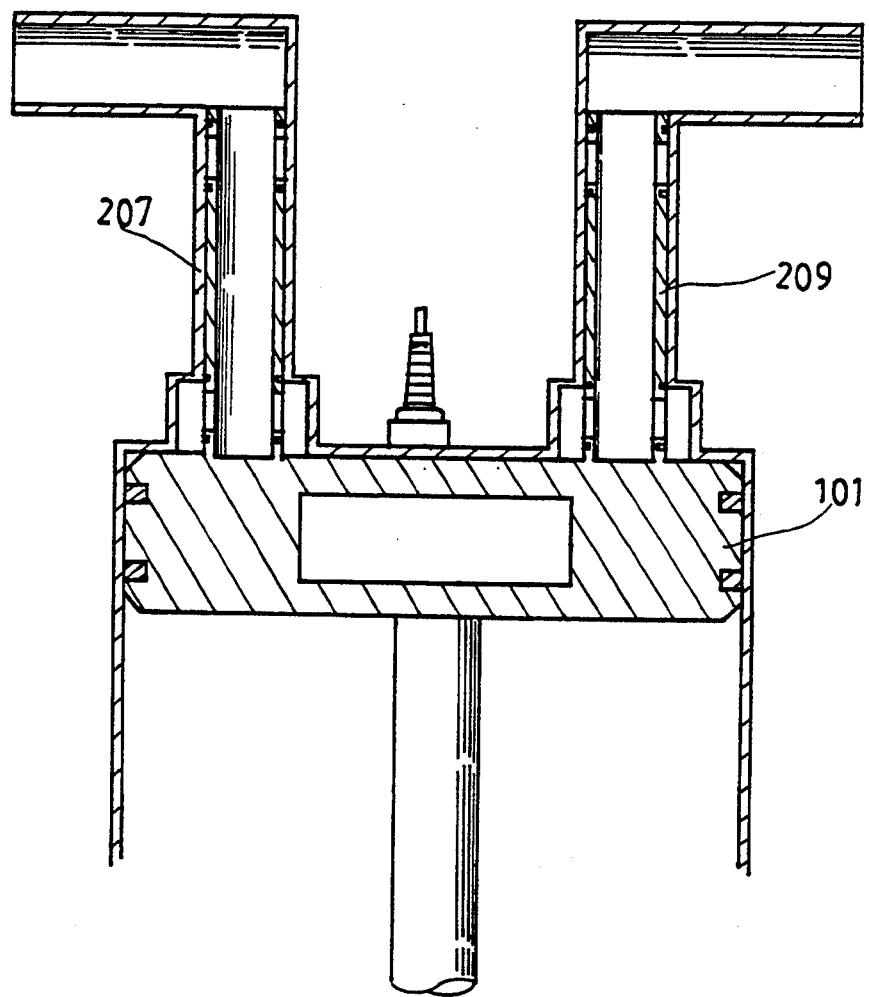
FIG. 9 is a longitudinal view in section of a shaft engine according to a third embodiment of the present invention.

Referring to FIG. 9, therein illustrated is still another alternate form of the present invention arranged to use a conventional top-mounted spark plug; the shafts 207;209 of the piston 101 have radial holes at two opposite ends respectively fastened with seal rings. This arrangement allows the cylinder to take in the fuel gas and release exhaust gas.

Figure 10:
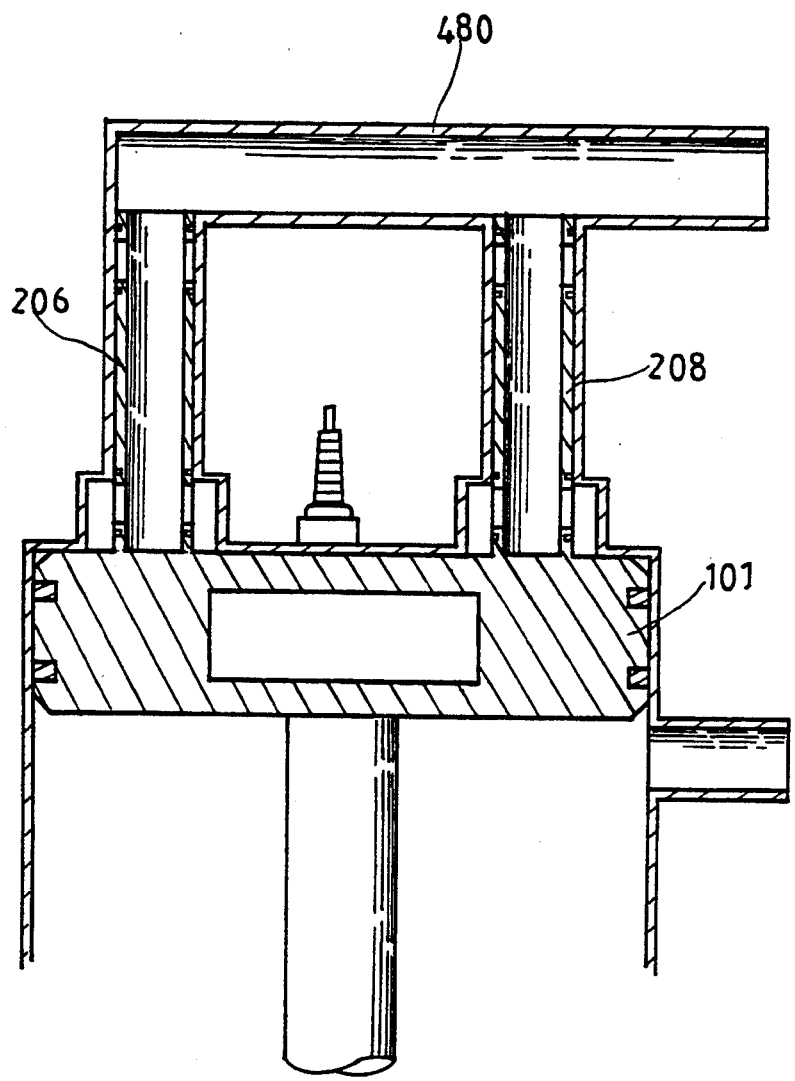
FIG. 10 is a longitudinal view in section of a shaft engine according to a fourth embodiment of the present invention.

Referring to FIG. 10, therein illustrated is still another alternate form of the present invention, in which a conventional piston 101 is used; the cylinder has an intake pipe at one side through which the fuel gas is sent into the cylinder; the two shafts 206;208 which are reciprocated by the piston 101 are linked by a transverse tube 480 for sending exhaust gas out of the cylinder.

In the embodiments shown in FIGS. 1 through 8, an output of power is produced upon each down or up stroke. The embodiments shown in FIGS. 9 and 10 are two stroke engines. Either embodiment of the present invention eliminates the installation of crank shaft, intake and exhaust air valves, and the related linking mechanism.

What is claimed is:

1. A shaft engine comprising a cylinder having at least one spark plug and at least one raised air chamber, each raised air chamber having an extension tube extending outwardly from said cylinder, a piston moved up and down in said cylinder by means of the ignition of a fuel gas introduced into said cylinder, the ignition being accomplished by said spark plug, at least one cylinder shaft respectively received in said at least one raised air chamber and the corresponding extension tube, said cylinder shaft being reciprocated by said piston to move a crank shaft outside said cylinder, each cylinder shaft being peripherally mounted with seal rings to seal the gap between the extension tube in which it is mounted and said cylinder shaft having a longitudinal air passage which communicates, as the piston reciprocates, with the raised air chamber for exhausting gas from said cylinder to the surrounding atmosphere.

2. The shaft engine of claim 1 wherein said cylinder comprises a fuel gas intake pipe in the middle at one lateral side; said at least one cylinder shaft includes two first cylinder shafts linked for sending out exhaust gas and two second cylinder shafts for cooling and lubrication, each first cylinder shaft comprising a first radial air hole near a top end thereof and a second radial air hole near a lower end thereof; each extension tube has two radial through holes at different elevations respectively communicated with the raised air chamber, the radial through holes on the extension tube being closed upon the down stroke of said first cylinder shafts and opened upon the up stroke.

3. The shaft engine of claim 2 wherein said second cylinder shafts include a cylinder shaft having an upper longitudinal oil passage at its top linked to an inside space of said piston through a radial through hole thereof, and a second having a lower longitudinal oil passage at its bottom linked to said inside space of said piston through a radial through hole thereof.

4. The shaft engine of claim 2 wherein said piston is comprised of two symmetrical parts spaced at different elevations by an oil space; said second cylinder shafts include a cylinder shaft having an upper longitudinal oil passage at its top linked to the oil space between the two symmetrical parts of said piston through a radial through hole thereof, and a second cylinder shaft having a lower longitudinal oil passage at its bottom linked to the oil space between the two symmetrical parts of said piston through a radial through hole thereof.

5. The shaft engine of claim 2 wherein said first cylinder shafts include a cylinder shaft having a longitudinal air passage for guiding a fuel gas into said cylinder, and the other cylinder shaft having a longitudinal air passage for sending exhaust gas out of said cylinder.

6. The shaft engine of claim 1 wherein said at least one cylinder shaft includes two cylinder shafts, one cylinder shaft having a longitudinal air passage for guiding a fuel gas into said cylinder, and the other cylinder shaft having a longitudinal air passage for sending exhaust gas out of said cylinder; said at least one spark plug includes only one spark plug mounted on said cylinder at one end.

7. The shaft engine of claim 6 wherein the two cylinder shafts are linked by a transverse tube outside said cylinder for sending exhaust gas out of said cylinder; said cylinder having a fuel gas intake pipe at one lateral side thereof.

* * * * *